US009732988B1

(12) United States Patent
Spero et al.

(10) Patent No.: US 9,732,988 B1
(45) Date of Patent: Aug. 15, 2017

(54) THERMAL STORAGE DEVICE INCLUDING A PLURALITY OF DISCRETE CANISTERS

(71) Applicant: Thermal Storage Systems, Los Angeles, CA (US)

(72) Inventors: Alan J. Spero, Ramona, CA (US); Frank Stephen Wyle, Los Angeles, CA (US); James H. Cohen, Glendale, CA (US)

(73) Assignee: Thermal Storage Systems, Los Angeles, CA (US)

( * ) Notice: Subject to any disclaimer, the term of this patent is extended or adjusted under 35 U.S.C. 154(b) by 378 days.

(21) Appl. No.: 13/906,178

(22) Filed: May 30, 2013

Related U.S. Application Data

(60) Provisional application No. 61/653,137, filed on May 30, 2012, provisional application No. 61/755,707, filed on Jan. 23, 2013, provisional application No. 61/755,714, filed on Jan. 23, 2013.

(51) Int. Cl.
*F24J 2/46* (2006.01)

(52) U.S. Cl.
CPC .................................... *F24J 2/46* (2013.01)

(58) Field of Classification Search
CPC ...................................... F24J 2/34; F24J 2/46
USPC ................................................. 126/617–619
See application file for complete search history.

(56) References Cited

U.S. PATENT DOCUMENTS

| 4,121,563 | A | * | 10/1978 | Gold | F24H 7/025 110/323 |
|---|---|---|---|---|---|
| 4,154,292 | A | * | 5/1979 | Herrick | F28D 20/02 126/400 |
| 4,316,048 | A | * | 2/1982 | Woodall | 136/253 |
| 4,416,260 | A | * | 11/1983 | Proctor | A01G 9/243 126/400 |
| 4,471,834 | A | * | 9/1984 | Schlote | F24D 11/007 126/400 |
| 4,545,364 | A | * | 10/1985 | Maloney | F24J 2/0433 126/569 |
| 4,579,170 | A | * | 4/1986 | Moses et al. | 165/104.17 |
| 4,809,771 | A | * | 3/1989 | Kennel | C09K 5/06 126/400 |
| 4,924,935 | A | * | 5/1990 | Van Winckel | 165/10 |
| 4,945,731 | A | * | 8/1990 | Parker et al. | 60/641.15 |
| 4,993,481 | A | * | 2/1991 | Kamimoto et al. | 165/10 |

(Continued)

OTHER PUBLICATIONS

Radosevich et al.; *Thermal Energy Storage Development for Solar Electrical Power and Process Heat Applications*, vol. 105, Journal of Solar Energy Engineering, May 1983.

*Primary Examiner* — Jorge Pereiro
(74) *Attorney, Agent, or Firm* — Larry E. Henneman, Jr.; Gregory P. Gibson; Henneman & Associates, PLC

(57) ABSTRACT

A novel thermal storage device is made up of a plurality of thermal storage canisters. The canisters are in thermal contact with one another so as to form a single thermal storage body. Because the thermal storage device can be broken down into a plurality of discrete thermal storage canisters, it is portable and has a high thermal storage capacity. In a particular embodiment, each canister contains a metal phase change material. In a more particular embodiment, the canisters each have a concave region such that when the canisters are assembled the concave regions, together, define a solar receiver.

32 Claims, 6 Drawing Sheets

(56) References Cited

U.S. PATENT DOCUMENTS

| | | | | |
|---|---|---|---|---|
| 5,074,283 A | * | 12/1991 | Beatty | C09K 5/06 126/618 |
| 5,088,548 A | * | 2/1992 | Lindner et al. | 165/10 |
| 5,459,996 A | * | 10/1995 | Malloy et al. | 60/200.1 |
| 6,059,016 A | * | 5/2000 | Rafalovich | B60H 1/00492 165/10 |
| 6,165,612 A | * | 12/2000 | Misra | 428/344 |
| 6,889,751 B1 | * | 5/2005 | Lukas et al. | 165/10 |
| 7,225,860 B2 | * | 6/2007 | Baginski | F28D 7/16 126/400 |
| 7,614,397 B1 | * | 11/2009 | Munson, Jr. | 126/617 |
| 8,464,535 B2 | * | 6/2013 | White | F01K 3/08 165/10 |
| 8,707,947 B2 | * | 4/2014 | Hollis | F24J 2/07 126/595 |
| 8,875,510 B2 | * | 11/2014 | McEnerney | F03G 6/00 126/617 |
| 9,076,996 B2 | * | 7/2015 | Bradwell et al. | |
| 2002/0000306 A1 | * | 1/2002 | Bradley | 165/10 |
| 2002/0135984 A1 | * | 9/2002 | Greenwood et al. | 361/708 |
| 2004/0211182 A1 | * | 10/2004 | Gould | F01K 13/00 60/643 |
| 2007/0029064 A1 | * | 2/2007 | Baginski et al. | 165/10 |
| 2011/0030915 A1 | * | 2/2011 | Best | 165/10 |
| 2011/0083436 A1 | * | 4/2011 | White et al. | 60/670 |
| 2011/0120669 A1 | * | 5/2011 | Hunt | 165/67 |
| 2011/0203573 A1 | * | 8/2011 | Hollis et al. | 126/595 |
| 2011/0290792 A1 | * | 12/2011 | Krzak | B65D 81/3816 220/1.5 |
| 2012/0018116 A1 | * | 1/2012 | Mathur | C09K 5/063 165/10 |
| 2012/0061065 A1 | * | 3/2012 | LaCombe | 165/185 |
| 2013/0034695 A1 | * | 2/2013 | Smith et al. | 428/143 |
| 2013/0251946 A1 | * | 9/2013 | Azimi et al. | 428/142 |
| 2014/0026569 A1 | * | 1/2014 | McEnerney et al. | 60/641.8 |

* cited by examiner

THERMAL STORAGE DEVICE INCLUDING A PLURALITY OF DISCRETE CANISTERS

This application claims the benefit of priority to U.S. Provisional Patent Application Ser. No. 61/653,137, filed May 30, 2012 by at least one common inventor and entitled "Self-Powered Solar Water Heater," which is incorporated by reference herein in its entirety. This application also claims the benefit of priority to U.S. Provisional Patent Application Ser. No. 61/755,707, filed Jan. 23, 2013 by at least one common inventor and entitled "High Energy Density Thermal Storage Device," which is incorporated by reference herein in its entirety. This application also claims the benefit of priority to U.S. Provisional Patent Application Ser. No. 61/755,714, filed Jan. 23, 2013 by at least one common inventor and entitled "High Energy Density Thermal Storage Device With Metallic Phase Change Material Container," which is incorporated by reference herein in its entirety.

GOVERNMENT RIGHTS

This invention was made with government support under Contract No. W911QY-12-C-0058 awarded by the Department of Defense, U.S. Army, Natick Contracting Divison. The government has certain rights in the invention.

BACKGROUND OF THE INVENTION

Field of the Invention

This invention relates generally to devices for storing thermal energy and, more particularly, to devices that convert and store solar radiation in the form of thermal energy. Even more particularly, the invention relates to portable thermal storage systems.

Description of the Background Art

Thermal energy storage systems are a fast growing and evolving technology. Some systems convert solar energy into thermal energy and store it in some type of thermal storage medium (e.g., $NaNO_2$, $NaNO_3$, $CaCi_2$, $LiF$, $KNO_3$, etc.). Typically, this is done in large facilities that provide energy to multiple consumers. Such facilities often employ several light focusing devices, both light permissive (e.g. Fresnel lens) and reflective (e.g. parabolic mirror), to heat some type of large thermal storage device such as, for example, a fluid reservoir, a pipe network, etc.

Although such facilities provide useful clean energy, they are stationary and, therefore, can only provide energy to consumers that are located relatively close to the facility. In an effort to provide energy to more remote locations, portable thermal energy storage systems have been developed. Such systems typically include a small light focusing device that heats a discrete thermal storage device via sunlight.

There are several challenges with current portable thermal energy storage systems. For example, thermal storage devices of portable thermal energy storage systems typically have to be small so as to facilitate their portability. Of course, small thermal storage devices have an inherently low thermal energy storage capacity. In order to increase the thermal energy storage capacity of such devices, their size must be increased. As the size of the thermal storage device is increased, however, the portability of the overall system is proportionally decreased.

What is needed, therefore, is a thermal energy storage system that has a higher thermal energy storage capacity and improved portability.

SUMMARY

The present invention overcomes the problems associated with the prior art by providing a thermal energy storage device that is made up of a plurality of discrete thermal energy storage canisters.

The thermal energy storage device includes a first discrete canister, a second discrete canister, and a thermal storage medium. The first discrete canister includes a wall that further includes an exterior surface and an interior surface. The interior surface of the first discrete canister defines an interior cavity. The second discrete canister also includes a wall that further includes an exterior surface and an interior surface. The interior surface of the second discrete canister defines an interior cavity. The thermal storage medium is disposed in the cavity of the first discrete canister and in the cavity of the second discrete canister. Optionally, a greater number (e.g., 6, 7, 8, or any useful number) of discrete canisters can be employed in a single thermal energy storage device.

In a particular embodiment, the thermal energy storage system additionally includes a solar light receiver operative to convert solar energy into thermal energy and to transfer/conduct the thermal energy to the thermal storage medium. In a more particular embodiment, a region of the exterior surface of the first discrete canister defines a first part of the solar light receiver, and a region of the exterior surface of the second discrete canister defines a second part of the solar light receiver. In an even more particular embodiment, the region of the exterior surface of the first discrete canister defining the first part of the solar receiver is concave, and the region of the exterior surface of the second discrete canister defining said second part of said solar receiver is concave.

In another particular embodiment, the melting temperature of the first discrete canister and the second discrete canister is greater than the melting temperature of the thermal storage medium. In a more particular embodiment, the thermal storage medium is a phase change material operative to store thermal energy in the form of sensible heat and latent heat. In an even more particular embodiment, the phase change material is metal phase change material. In an even more particular embodiment, the metal phase change material includes aluminum. Optionally, the thermal storage medium can additionally include silicon.

In an example embodiment, the first canister and the second canister are constructed from a material that includes silicon carbide. In another example embodiment, the interior surfaces of the walls of the first canister and the second canister are coated with a material that includes boron nitride. In another example embodiment, the first canister and the second canister are constructed from a material that includes Inconel.

In an example embodiment, the volume of the interior cavity of the first canister is greater than the volume of the thermal storage medium disposed in the interior cavity of the first canister when the first canister is heated to a maximum operating temperature of the thermal storage system. In a more particular embodiment, the thermal energy storage system additionally includes ullage gas disposed in the interior cavity of the first discrete canister and the interior cavity of the second discrete canister. In a more particular embodiment, the thermal storage medium is inert to the ullage gas.

In yet another particular embodiment, the interior surface of the first discrete canister and the interior surface of the second discrete canister are impervious to wetting by the thermal storage medium when the thermal storage medium is heated to a liquid state. In a more particular embodiment, the interior surface of the first discrete canister and the interior surface of the second discrete canister are treated and/or coated with an anti-wetting material operative to make the interior surface of the first canister and the interior surface of the second canister impervious to wetting when the thermal storage medium is heated to a liquid state. For example, the anti-wetting material can include, without limitation, boron nitride or aluminum oxide. Alternatively, the first discrete canister and the second discrete canister can be directly formed from a material that is impervious to wetting when the thermal storage medium is heated to a liquid state.

The disclosed example thermal energy storage system additionally includes a heat exchanger that is in thermal contact with the exterior surface of the first discrete canister and the exterior surface of the second discrete canister. In a more particular embodiment, the first discrete canister and the second discrete canister are disposed within a perimeter enclosed by the heat exchanger.

An example thermal energy storage system also includes a solar light receiver, a heat exchanger, first piece of thermal insulation, a thermally insulating cover, and an opaque plate. The heat exchanger is disposed around the first discrete canister and the second discrete canister and is in thermal contact with the exterior surfaces of the first discrete canister and the second discrete canister. The first piece of thermal insulation is disposed around the heat exchanger. The thermally insulating cover is disposed over the solar light receiver and defines an aperture that permits the solar energy to impinge on the solar light receiver. The opaque plate is disposed over the thermally insulating cover and also defines an aperture that is aligned with the aperture of the thermally insulating cover.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a portable thermal storage system having a plurality of discrete thermal storage canisters in thermal contact with one another. In the following description, numerous specific details are set forth (e.g., types of light focusing devices, types of thermal storage media, etc.) in order to provide a thorough understanding of the invention. Those skilled in the art will recognize, however, that the invention may be practiced apart from these specific details. In other instances, details of well known metallurgy practices (e.g., alloying, surface treatment, etc.) and components have been omitted, so as not to unnecessarily obscure the present invention.

Figure 1:
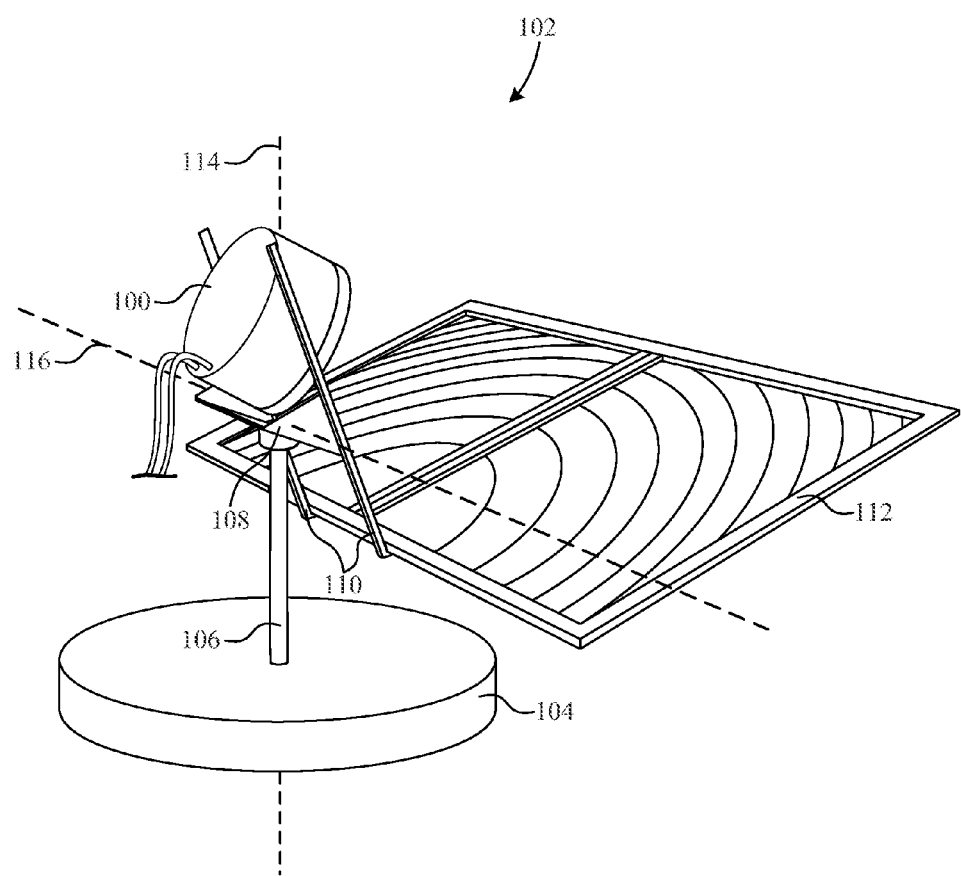
FIG. 1 is a perspective view of a solar energy collection system.

FIG. 1 is a perspective view of a thermal energy storage system 100 which, in this particular embodiment, is depicted as being part of a portable solar energy collection system 102. In addition to thermal energy storage system 100, solar energy collection system 102 also includes a base 104, a support pole 106, a mounting bracket 108, a set of support arms 110, and a light focusing device 112. Pole 106 is coupled to base 104, bracket 108 is coupled to pole 106, arms 110 are coupled to bracket 108, light focusing device 112 is coupled to arms 110, and thermal storage system 100 is coupled to arms 110.

Base 104 is a low-profile structure that is adapted to sit on a flat surface (i.e. ground) and fixably supports pole 106 in an upright vertical position. In this particular embodiment, base 104 is a flat cylindrical reservoir adapted to hold water so as to prevent system 102 from tipping. Of course, when transporting system 102, the water can be drained from base 104.

Pole 106 is a rigid support member that includes a first end fixably mounted to base 104 and an opposite second end coupled to mounting bracket 108. Accordingly, pole 106 supports bracket 108, arms 110, light focusing device 112, and thermal storage system 100.

Mounting bracket 108 is pivotally mounted to pole 106 such that both cooperate as a trunnion assembly. That is, mounting bracket 108 can pivot about a first axis 114 that is coaxial to pole 106 and a second axis 116 that is perpendicular to first axis 114. Rotation of mounting bracket 108 about first axis 114 provides a means for adjusting the azimuth angle of system 102. Similarly, rotation of mounting bracket 108 about second axis 116 provides a means for adjusting the elevation angle of system 102.

Arms 110 are rigid support members that are fixably mounted to opposite sides of bracket 108. Furthermore, arms 110 are fixably attached to light focusing device 112 and thermal storage system 100. Accordingly, when the azimuth and/or elevation angle of system 102 is changed, bracket 108, arms 110, light focusing device 112, and thermal storage system 100 move together as a single rigid body.

Light focusing device 112 is, for example, a Fresnel reflector operative to reflect and focus incident solar radiation onto thermal storage device 100 where it is absorbed and then stored in the form thermal energy.

System 102 could also include a two-axis sun tracking system (not shown) that automatically adjusts the azimuth and elevation of system 102 according to the position of the sun. Such a system could include, for example, a controller that communicates with a sun-sensor that detects the position of the sun, and a set of slewing drives that adjust the azimuth and elevation of the system.

Figure 2:
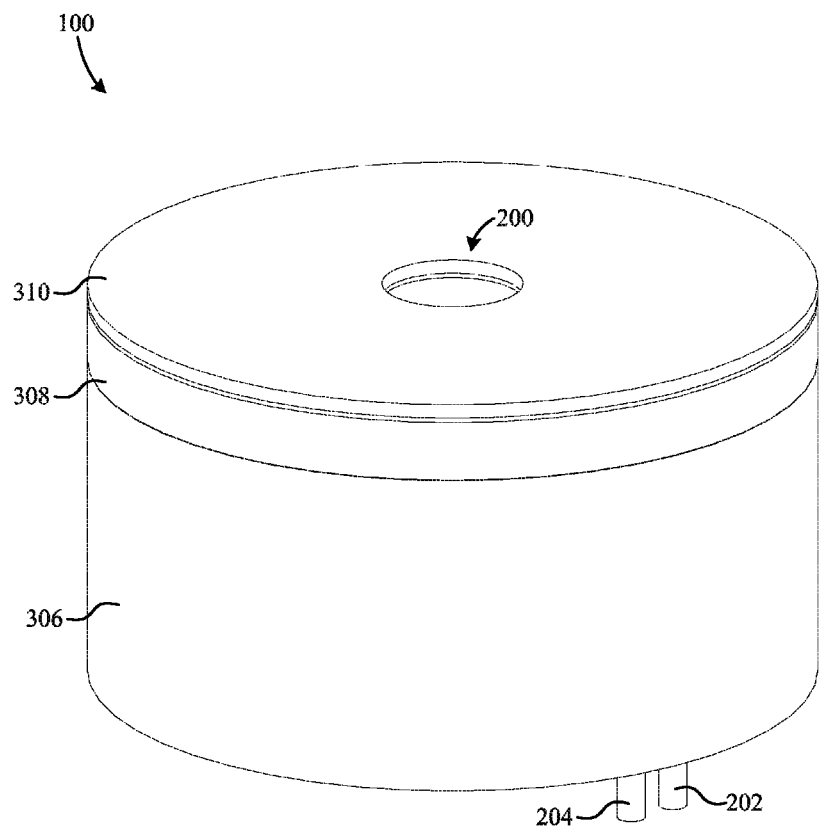
FIG. 2 is a perspective view of a thermal energy storage system of the solar energy collection system of FIG. 1.

FIG. 2 shows a perspective view of thermal storage system 100. During operation, sunlight is concentrated and reflected through an aperture 200 on the front of thermal storage system 100. The light is then absorbed and stored in thermal storage system 100 in the form of thermal energy. The thermal energy can then be removed by circulating heat exchange fluid into and out of thermal energy storage system 100 through a fluid inlet 202 and outlet 204, respectively.

Figure 3:
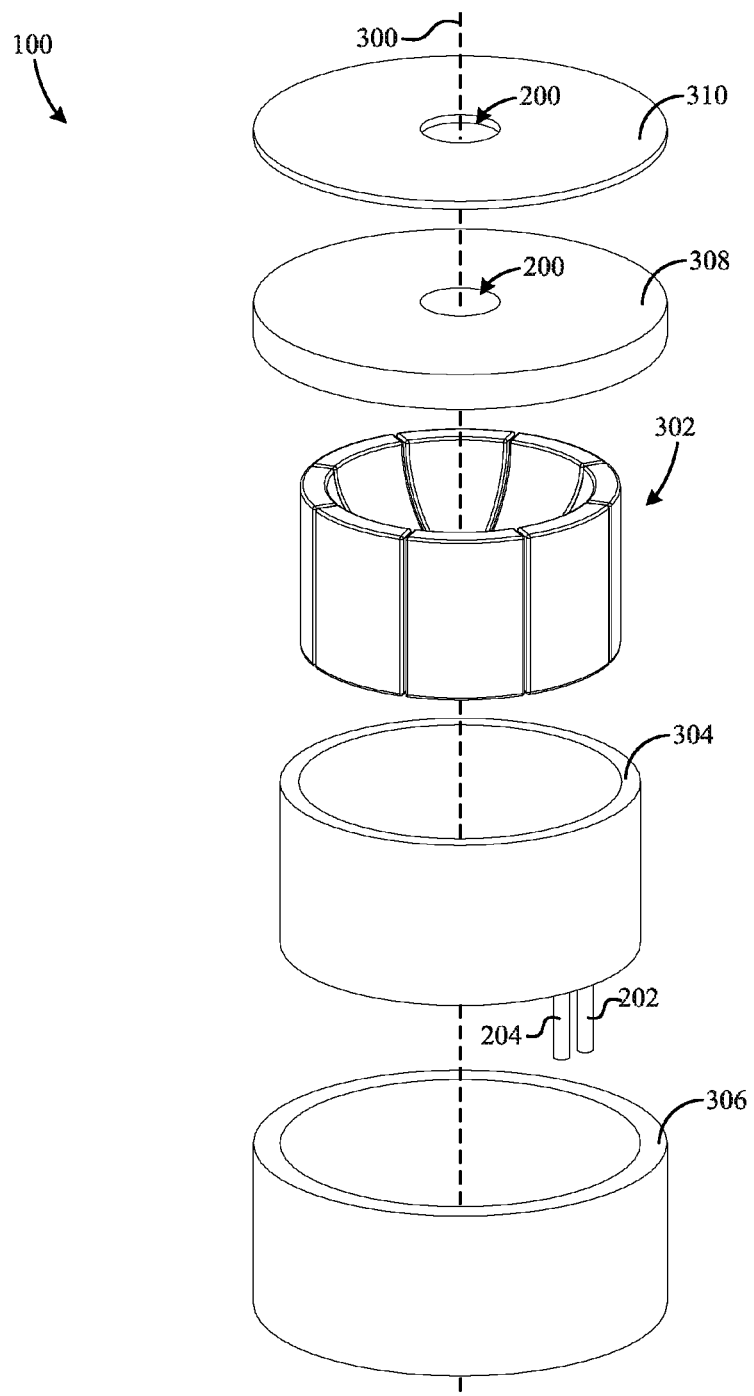
FIG. 3 is an exploded, perspective view of the thermal energy storage system of the solar energy collection system of FIG. 1.

FIG. 3 shows a perspective view of thermal storage system 100 exploded along an axis 300. Thermal energy storage system 100 includes a thermal energy storage device 302, a heat exchanger 304, an insulation jacket 306, an insulation cover 308, and an opaque plate 310. When assembled, thermal energy storage device 302 is seated within heat exchanger 304, insulation jacket 306 is disposed around heat exchanger 304, insulation cover 308 is disposed over thermal storage device 302, and plate 310 is disposed over insulation cover 308.

Thermal storage device 302 is operative to absorb solar radiation and store it in the form of thermal energy. Thermal storage device 302 is discussed in further detail in upcoming FIGS. 4-6.

Heat exchanger 304 is a circumferential heat exchanger that is thermal contact with thermal storage device 302. Heat exchanger 304 is operative to extract heat from thermal energy device 302 via a working fluid circulating therethrough. In this particular embodiment, the working fluid circulating through heat exchanger 304 is water. During operation, cool water enters inlet 202, is heated by thermal storage device 302, then exits outlet 204 as heated water and/or steam.

Insulation jacket 306 and insulation cover 308, together, enclose thermal storage device 302 and heat exchanger 304 so as to prevent heat from escaping into the atmosphere. As shown, aperture 200 is formed through insulation cover 308 so as to permit focused light to pass therethrough.

Opaque plate 310 is operative to minimize emissive losses from thermal storage device 310. As shown, aperture 200 is also formed through opaque plate 310 so as to permit focused light to pass therethrough.

Figure 4:
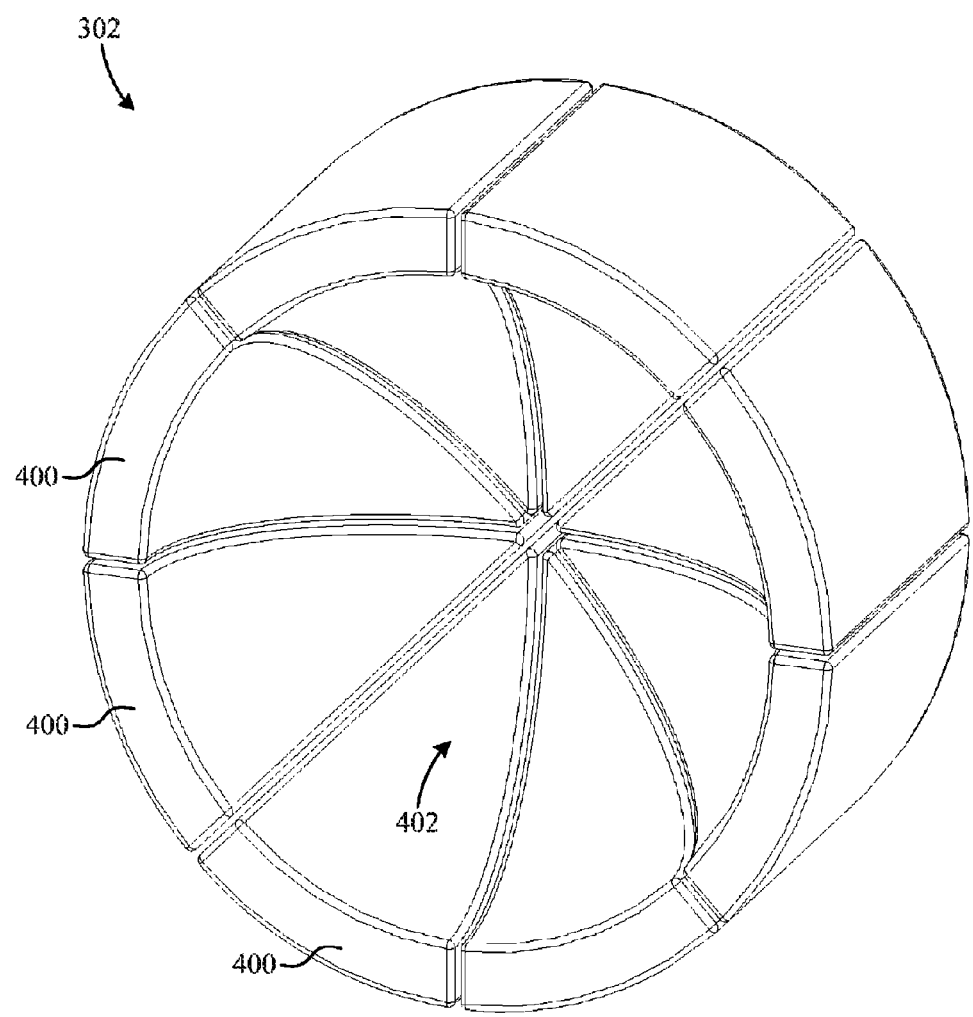
FIG. 4 is a perspective view of a thermal storage device of the thermal energy storage system of FIG. 3.

FIG. 4 is a perspective view of thermal storage device 302. As shown, thermal storage device 302 is made up of a plurality of discrete pie-shaped thermal storage canisters 400 that, when assembled, function as a single thermal storage body. Canisters 400 are configured such that each is disposed between, and in thermal contact with, two adjacent canisters 400. In this particular embodiment, each of canisters 400 is concave so as to, together, define a solar receiver 402 on the face of thermal storage device 302. Solar receiver 402 provides a surface whereon focused light is absorbed and stored as thermal energy by canisters 400. Depending on the particular application, receiver 402 could be either a semi-spherical or semi-elliptical concave surface.

One important aspect of the present invention is that thermal storage device 302 is more portable than conventional one-piece thermal storage devices. This is because thermal storage device 302 is made up of several smaller canisters 400 that can be assembledidisassembled and transported individually. In this example, thermal storage device 302 is made up of eight discrete canisters 400. However, those skilled in the art will recognize that the number of canisters needed to make up a full thermal storage device will vary depending on the particular application.

Figure 5:
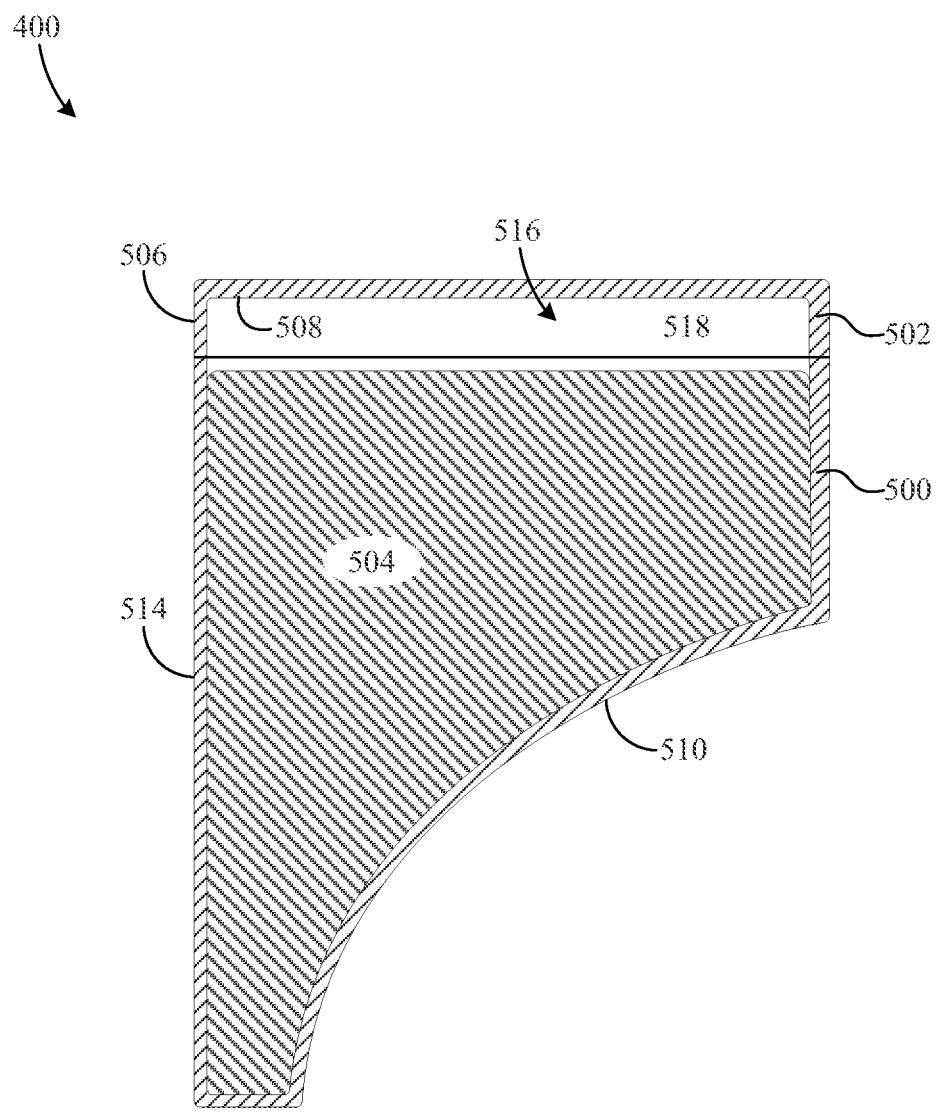
FIG. 5 is a cross sectional view of a discrete thermal energy storage canister of the thermal energy storage device FIG. 4.

FIG. 5 shows a cross-sectional side view of one of canisters 400. In this particular embodiment, canister 400 includes a wall 500 and a lid 502 that are coupled together to enclose a thermal storage medium 504 therein. Although not shown, lid 502 seals against the rest of wall 500 by some suitable means such as, for example, adhesives, gaskets, etc. The fastening of lid 502 to the rest of wall 500 can also be achieved by any suitable means such as, for example, clamps, bolts, screws, etc. Alternatively, lid 502 can be permanently fixed to the rest of wall 500 by some suitable means (e.g. welding) after thermal storage medium 504 is disposed therein.

Wall 500 includes an exterior surface 506 and an interior surface 508. Exterior surface 506 includes a concave region 510, two side regions 512 (Visible in FIG. 6), and an outer region 514. Concave region 510 defines one of the eight parts that make up receiver 402 and, therefore, provides a part of exterior surface 506 through which light is absorbed.

Side regions 512 are adapted to engage side regions 512 of adjacent canisters 400. When thermal storage device 302 is assembled, each of side regions 512 is in thermal contact with another side region 512 of an adjacent canister 400 so as to facilitate conductive heat transfer therebetween. Outer region 514 is adapted to engage the cylindrical inner surface of heat exchanger 304. Interior surface 508 defines a cavity 516 wherein thermal storage medium 504 is disposed. Cavity 516 also contains a ullage gas 518 that accommodates the volumetric expansion of thermal storage medium 504 that takes place when thermal storage medium is heated and cooled. Of course, ullage gas 518 is also inert to thermal storage medium 504.

In this particular embodiment, thermal storage medium 504 is metal phase change material (MPCM) such as, for example, aluminum. There are many useful advantages to using an MPCM as thermal storage medium 504. For example, thermal storage medium 504 can store energy in the form of both sensible and latent heat. As a result, thermal storage medium 504 is capable of storing large amounts of thermal energy as well as achieving high energy transfer rates both into and out of thermal storage device 302. The use of certain metals for this purpose can provide high energy density equivalent to that of a phase-change salt, while also exhibiting the high power density required to rapidly extract energy through solidified and/or partially solidified thermal storage medium 504. In particular, materials such as aluminum and certain alloys thereof, when used as a MPCM, optimize these desirable properties by combing a high heat of fusion with high thermal conductivity, especially in the solid state.

Figure 6:
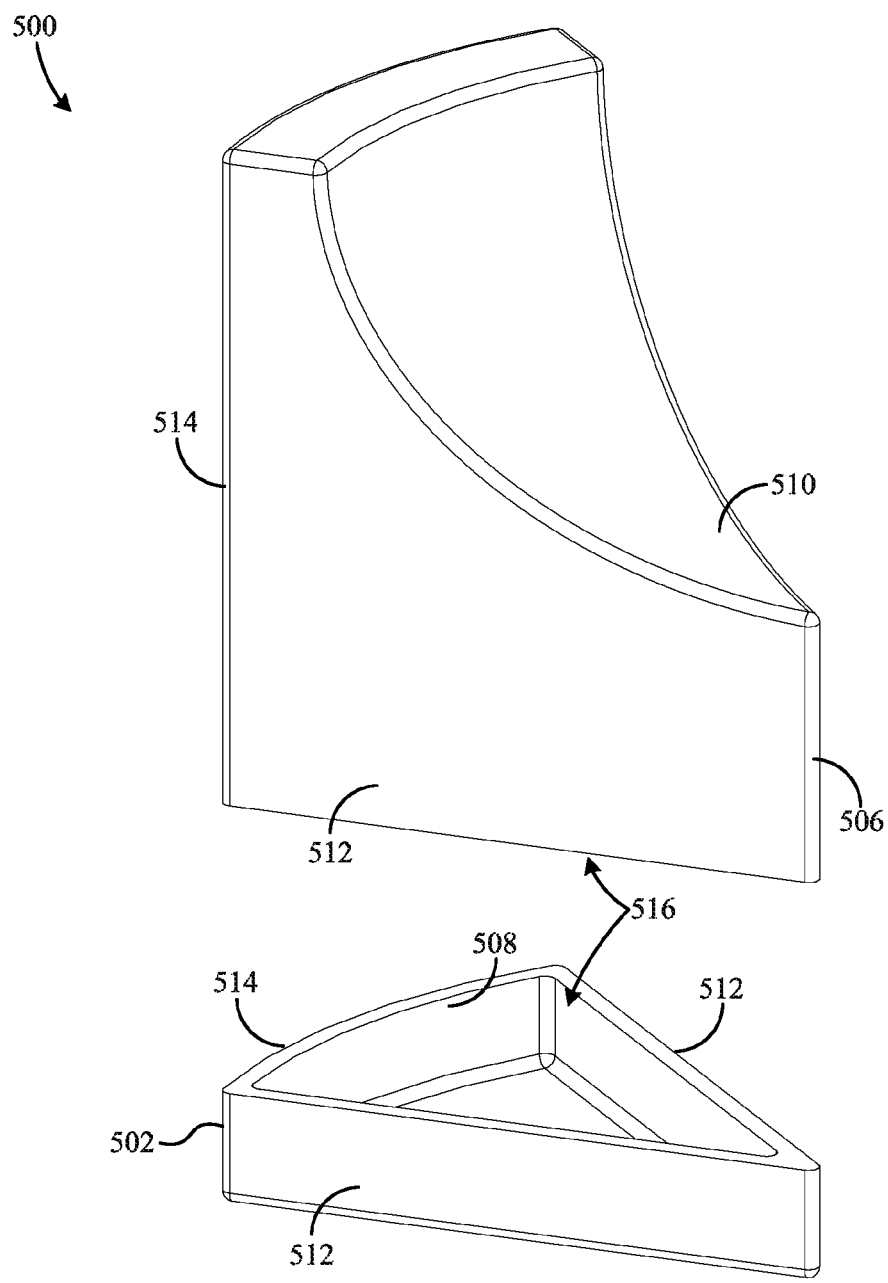
FIG. 6 is a perspective view of a discrete thermal energy storage canister of FIG. 4 with its lid detached.

FIG. 6 shows a perspective view of wall 500 with lid 502 removed. In choosing suitable materials for thermal storage medium 504 and wall 500, several design aspects must be taken into consideration.

As one example, wall 500 can be sealed so that gas cannot escape nor air enter into cavity 516 when thermal storage medium 504 is melted or solidified. This prevents thermal storage medium 504 from oxidizing during use and permits the use of inert ullage gas 518.

Alternatively, in applications where oxidization is not a concern, a vent (not shown) can be provided to allow air to enter and exit cavity 516 to equalize pressure. If vents are used, it is advantageous to position the vents at different locations on different canisters. In particular, the vent of a particular canister is located on the canister based on the particular canister's location and/or orientation within the array of canisters. In this way, the vent of each canister is maintained above the surface of the liquid thermal storage medium in the canister.

As another example, the volume of cavity 516 is chosen such that it is sufficiently greater than the volume of thermal storage medium 504 when the volume of thermal storage medium 504 is at its maximum (usually when it is entirely liquid) plus some additional volume for ullage gas 518. This ensures that wall 500 will not be breached by thermal storage medium 504 as its density changes during the phase change process, or be breached due to the increase in pressure of ullage gas 518 during heating.

As another example, the material of wall 500 should have a thermal conductivity that is high in relation to the surface area over which the thermal energy is introduced into thermal storage medium 504 and over the surface area in which the thermal energy is extracted (i.e. surface area of outer region 512). The inventors have found various metals, metal alloys, and ceramics to be suitable materials for wall 500.

As another example, the material of wall 500 should be chosen so that molten thermal storage medium 504 does not wet or react with interior surface 508. This ensures that thermal storage medium 504 will not compromise the integrity of wall 500 and will withdraw from interior surface 508 during the liquid-to-solid phase change after which thermal storage medium undergoes contraction as it cools further. The non-wetting property prevents thermal storage medium 504 from distorting wall 500 during cooling and prevents thermal storage medium 504 from producing excessive stresses in wall 500) as thermal storage medium 504 is reheated during the energy storage process. If a chemically active MPCM such as aluminum is used for thermal storage medium 504, it is advantageous for wall 500 to be fabricated from a silicon/carbon/alumina ceramic (of which several formulations are commercially available) that has sufficiently high thermal conductivity. Formulations of fine-grained silicon carbide and boron nitride have been found by the inventors to meet the structural, thermal conductivity and non-wetting criteria required for an aluminum MPCM container. Additionally, composite materials have been determined to be suitable, which are produced from a reaction of silica with molten aluminum via a process known as reactive metal penetration, producing an interpenetrating phase composite of aluminum oxide and aluminum metal, where silicon is alloyed with aluminum in the metal phase. This material has the desirable property of a significantly higher thermal conductivity than other candidate materials. Alternatively, inert coatings can be used to protect an otherwise chemically active container material. Again, as an example, if thermal storage medium 504 is aluminum, then wall 500 can be fabricated from a suitable metal, such as Inconel, and interior surface 508 can then be coated with an alumina coating to protect the Inconel from the molten aluminum.

As another example, the materials chosen for thermal storage medium 504 and wall 500 is dependent in-part upon the desired operating temperature range of system 100. However, the melting temperature of thermal storage medium 504 must be within this range of operating temperatures. It is important to note that a large operating temperature range permits extensive use of sensible heat as a storage mechanism, in addition to latent heat. Indeed, informed choices for the operating temperature range can effectively double the energy storage density achievable with a given volume of thermal storage medium 504.

As another example, the material of thermal storage medium 504 may be combined with admixtures of other elements (for example, aluminum may be combined with silicon) with the intent of minimizing the reaction rates between thermal storage medium 504 and interior surface 508, or with the intent of modifying the melting temperature for the purpose of controlling reaction rates and/or adjusting the operating temperature range of thermal storage device 302. For this latter purpose, the inventors have found eutectic mixtures to be particularly advantageous.

The description of particular embodiments of the present invention is now complete. Many of the described features may be substituted, altered or omitted without departing from the scope of the invention. For example, alternate light focusing mechanisms (e.g. parabolic reflectors), may be substituted for Fresnel reflector 112. As another example, there could be multiple heat exchangers in thermal contact with thermal storage device 302. As yet another example, thermal storage device 302 could be made up of any number of discrete thermal storage canisters. As yet another example, the canister lids can be formed integrally with the canister walls, and the thermal storage medium can be introduced into the canister by some other means (e.g., through a port in the wall, the canister being formed around the medium, etc.). As yet another example, the discrete canisters can be supported in a frame or have plates disposed therebetween, which functions as a portion of the heat exchange device. These and other deviations from the particular embodiments shown will be apparent to those skilled in the art, particularly in view of the foregoing disclosure.

We claim:

1. A thermal energy storage system comprising:
a first discrete canister having a wall, said wall of said first discrete canister having an exterior surface and an interior surface, said interior surface of said first discrete canister defining an interior cavity;
a second discrete canister having a wall, said wall of said second discrete canister having an exterior surface and an interior surface, said exterior surface of said second discrete canister being in thermal contact with said exterior surface of said first discrete canister, said interior surface of said second discrete canister defining an interior cavity;
a thermal storage medium disposed in said interior cavity of said first discrete canister and said interior cavity of said second discrete canister; and
a solar light receiving cavity in which solar energy is converted into thermal energy and said thermal energy is transmitted to said thermal storage medium; and wherein
said first discrete canister and said second discrete canister are free of conduits passing therethrough;
a region of said exterior surface of said first discrete canister defines a first part of said solar light receiving cavity, and
a region of said exterior surface of said second discrete canister defines a second part of said solar light receiving cavity.

2. The thermal energy storage system of claim 1, further comprising a heat exchanger adapted to facilitate the passage of a heat transfer fluid, to conduct heat from said thermal storage medium to said heat transfer fluid, and to prevent direct physical contact between said heat transfer fluid and said walls of said first discrete canister and said second discrete canister.

3. The thermal energy storage system of claim 1, wherein said region of said exterior surface of said first discrete canister and said region of said exterior surface of said second discrete canister include a concave, ellipsoidal surface.

4. A thermal energy storage system comprising:
a first discrete canister having a wall, said wall of said first discrete canister having an exterior surface and an interior surface, said interior surface of said first discrete canister defining an interior cavity;
a second discrete canister having a wall, said wall of said second discrete canister having an exterior surface and an interior surface, said exterior surface of said second discrete canister being in thermal contact with said exterior surface of said first discrete canister, said interior surface of said second discrete canister defining an interior cavity; and
a thermal storage medium disposed in said interior cavity of said first discrete canister and said interior cavity of said second discrete canister; and a solar light receiving cavity wherein solar energy is converted into thermal energy and said thermal energy is transmitted to said thermal storage medium; and wherein each of said first discrete canister and said second discrete canister are individually removable and are free of conduits passing therethrough;

a region of said exterior surface of said first discrete canister defines a first part of said solar light receiving cavity, and a region of said exterior surface of said second discrete canister defines a second part of said solar light receiving cavity.

5. The thermal energy storage system of claim 4, further comprising a heat exchanger adapted to facilitate the passage of a heat transfer fluid, to conduct heat from said thermal storage medium to said heat transfer fluid, and to prevent direct physical contact between said heat transfer fluid and said walls of said first discrete canister and said second discrete canister.

6. The thermal energy storage system of claim 4, wherein said region of said exterior surface of said first discrete canister and said region of said exterior surface of said second discrete canister include a concave, ellipsoidal surface.

7. A thermal energy storage system comprising:
a first discrete canister having a wall, said wall of said first discrete canister having an exterior surface and an interior surface, said interior surface of said first discrete canister defining an interior cavity;
a second discrete canister having a wall, said wall of said second discrete canister having an exterior surface and an interior surface, said exterior surface of said second discrete canister being in thermal contact with said exterior surface of said first discrete canister, said interior surface of said second discrete canister defining an interior cavity;
a thermal storage medium disposed in said interior cavity of said first discrete canister and said interior cavity of said second discrete canister; and
a solar light receiving cavity in which solar energy is converted into thermal energy and said thermal energy is transmitted to said thermal storage medium; and wherein
said first discrete canister and said second discrete canister are free of conduits passing therethrough and are removable, thereby enabling disassembly of said thermal energy storage system, separate transportation of said first discrete canister and said second discrete canister, and reassembly of said thermal energy storage system;
a region of said exterior surface of said first discrete canister defines a first part of said solar light receiving cavity, and
a region of said exterior surface of said second discrete canister defines a second part of said solar light receiving cavity.

8. The thermal energy storage system of claim 7, wherein said region of said exterior surface of said first discrete canister defining said first part of said solar light receiving cavity includes a concave, ellipsoidal surface; and
said region of said exterior surface of said second discrete canister defining said second part of said solar light receiving cavity includes a concave, ellipsoidal surface.

9. The thermal energy storage system of claim 7, wherein the melting temperature of said first discrete canister and said second discrete canister is greater than the melting temperature of said thermal storage medium.

10. The thermal energy storage system of claim 9, wherein said thermal storage medium is a phase change material operative to store thermal energy in the form of sensible heat and latent heat.

11. The thermal energy storage system of claim 10, wherein said phase change material is a metal phase change material.

12. The thermal energy storage system of claim 11, wherein said metal phase change material includes aluminum.

13. The thermal energy storage system of claim 12, wherein said first canister and said second canister are constructed from a material that includes silicon carbide.

14. The thermal energy storage system of claim 12, wherein said first canister and said second canister are constructed from a material that includes boron nitride.

15. The thermal energy storage system of claim 12, wherein said first canister and said second canister are constructed from a material that includes Inconel.

16. The thermal energy storage system of claim 7, wherein the volume of said interior cavity of said first canister is greater than the volume of said thermal storage medium disposed in said interior cavity of said first canister when said first canister is heated to a maximum operating temperature of said thermal storage system.

17. The thermal energy storage system of claim 16, further comprising ullage gas disposed in said interior cavity of said first discrete canister and said interior cavity of said second discrete canister.

18. The thermal energy storage system of claim 17, wherein said thermal storage medium is inert to said ullage gas.

19. The thermal energy storage system of claim 7, wherein said interior surface of said first discrete canister and said interior surface of said second discrete canister are impervious to wetting when said thermal storage medium is heated to a liquid state.

20. The thermal energy storage system of claim 19, wherein said interior surface of said first discrete canister and said interior surface of said second discrete canister include an anti-wetting coating operative to make said interior surface of said first canister and said interior surface of said second canister impervious to wetting when said thermal storage medium is heated to a liquid state.

21. The thermal energy storage system of claim 20, wherein said anti-wetting coating includes boron nitride.

22. The thermal energy storage system of claim 19, wherein said first discrete canister and said second discrete canister are formed from a material that is impervious to wetting when said thermal storage medium is heated to a liquid state.

23. The thermal energy storage system of claim 7, further comprising a heat exchanger in thermal contact with said exterior surface of said first discrete canister and said exterior surface of said second discrete canister.

24. The thermal energy storage system of claim 23, wherein said first discrete canister and said second discrete canister are disposed in a perimeter enclosed by said heat exchanger.

25. The thermal energy storage system of claim 7, further comprising:
a heat exchanger in thermal contact with said exterior surface of said first discrete canister and said exterior surface of said second discrete canister, said heat exchanger being disposed around said first discrete canister and said second discrete canister;

thermal insulation disposed around said heat exchanger;

a thermally insulating cover disposed over said solar light receiver, said thermally insulating cover defining an aperture disposed to permit said solar energy to impinge on said solar light receiver; and an opaque plate disposed over said thermally insulating cover and defining an aperture to permit the passage of light therethrough, said aperture of said opaque plate being aligned with said aperture of said thermally insulating cover.

26. The thermal energy storage system of claim 7, wherein:

said thermal storage medium is metal phase change material;

said thermal energy storage system further includes a ullage gas disposed in said interior cavity of said first discrete canister and in said interior cavity of said second discrete canister, said metal phase change material being inert to said ullage gas;

said interior surface of said first discrete canister and said interior surface of said second discrete canister are impervious to wetting by said thermal storage medium when said thermal storage medium is heated to a liquid state; and said thermal energy storage system further includes a heat exchanger in thermal contact with said exterior surface of said first canister and said exterior surface of said second canister.

27. The thermal energy storage system of claim 7, further comprising an additional plurality of discrete canisters that, together with said first discrete canister and said second discrete canister, form a single thermal energy storage device.

28. The thermal energy storage system of claim 27, wherein said additional plurality of discrete canisters includes at least four discrete canisters.

29. The thermal energy storage system of claim 27, wherein said exterior surfaces of said walls of said plurality of said discrete canisters directly abut one another.

30. The thermal energy storage system of claim 27, wherein said exterior surfaces of said walls of said plurality of said discrete canisters are at least partially separated by a heat exchange device.

31. The thermal energy storage system of claim 30, wherein each of said plurality of discrete canisters includes a surface that forms a portion of a solar energy receiving feature.

32. The thermal energy storage system of claim 7, further comprising a heat exchanger adapted to facilitate the passage of a heat transfer fluid, to conduct heat from said thermal storage medium to said heat transfer fluid, and to prevent direct physical contact between said heat transfer fluid and said walls of said first discrete canister and said second discrete canister.

* * * * *